Patented June 22, 1926.

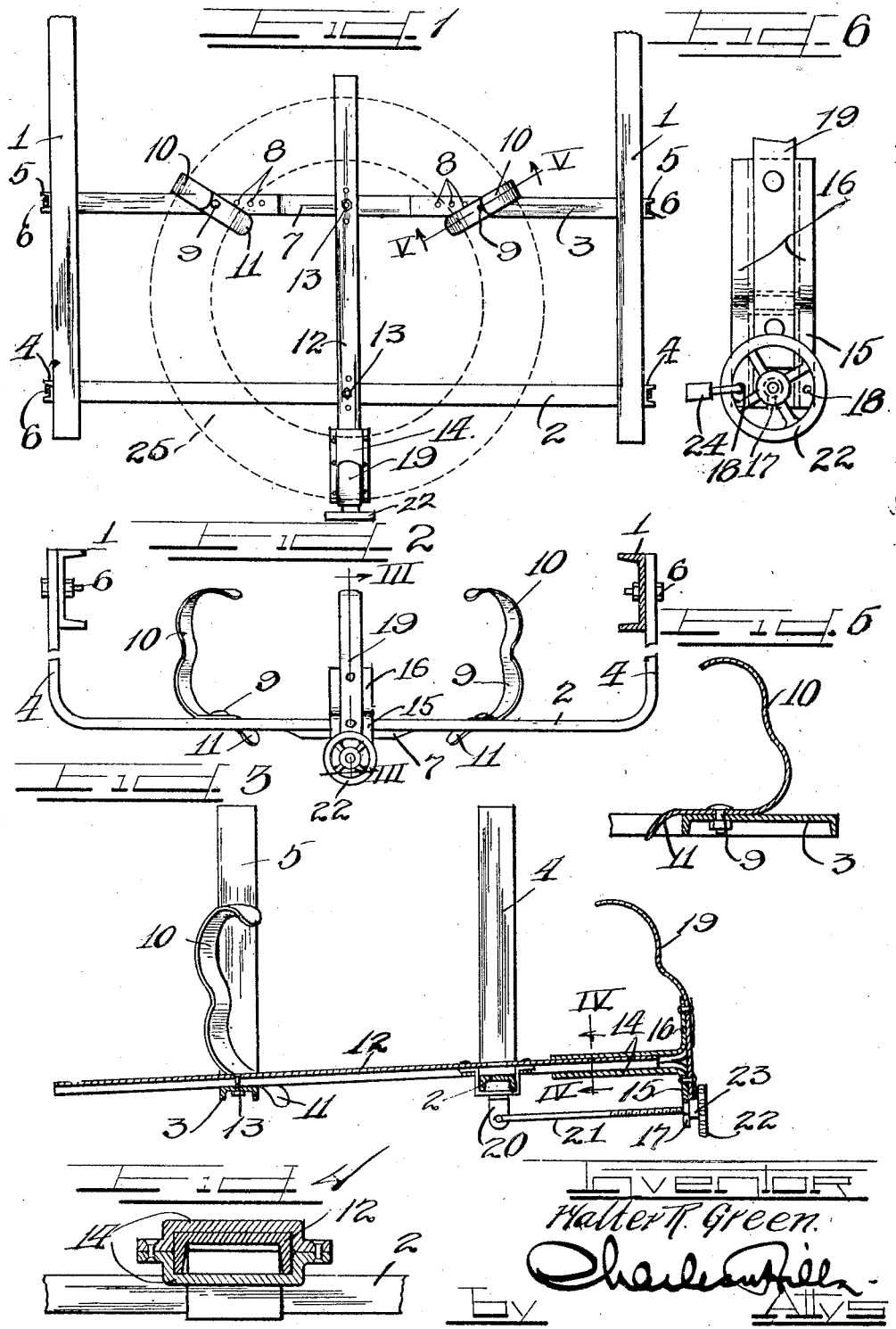

1,589,955

UNITED STATES PATENT OFFICE.

WALTER R. GREEN, OF CHICAGO, ILLINOIS.

UNDERSLUNG TIRE CARRIER.

Application filed July 28, 1925. Serial No. 46,591.

This invention relates to a vehicle spare tire carrier and more particularly to an underslung tire carrier for use on motor trucks and the like.

It is an object of this invention to provide a motor truck with an improved underslung tire carrier adapted to be adjusted to clamp tires in position against rattling with the clamping means locked against movement.

It is an important object of this invention to provide a simple form of tire carrier of the underslung type, said carrier being constructed of few parts with a shiftable clamping device adapted when in clamping position to be locked to a movable hand wheel to prevent release of the movable clamping device.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a tire carrier attached to the chassis sills of a truck and showing a tire in position in dotted lines;

Figure 2 is a front end elevation of the tire carrier;

Figure 3 is a vertical section taken on line III—III of Figure 2 with parts in elevation;

Figure 4 is an enlarged detail section taken on line IV—IV of Figure 3;

Figure 5 is a detail section of one of the tire clamps taken on line V—V of Figure 1, and Figure 6 is an enlarged front elevation of the clamping hand wheel and the lock therefor.

As shown on the drawings:

The reference numeral 1 indicates the sills of an automobile truck chassis, the rear ends of said sills being provided with spaced openings or apertures. Secured transversely of the chassis are channel shaped channel bars or brackets 2 and 3, the upturned arms 4 and 5 respectively of which are apertured and bolted to the chassis sills 1 by means of bolts 6 or other suitable means. The middle of the rear or innermost bracket 3 is offset or depressed as at 7. The middle of said offset portion is provided with an opening, as is also the middle portion of the inner bracket 2. Each side of the bracket 3 near the offset 7 is provided with a row of openings 8. Secured on the rear bracket 3 by means of bolts 9 are two double tire clamps 10 the lower ends 11 of which are deflected to engage against one side of the bracket 3. The series of spaced openings 8 in the bracket 3 permit the rear clamps 10 to be moved into different positions to receive tires of different sizes. The openings in the chassis sills 1 may also be positioned to permit different spacing of the two brackets 2 and 3.

Secured transversely of the two brackets 2 and 3 is a middle tire support or tire channel guide bar 12 held in place by means of bolts 13. The middle bar 12 is slightly inclined since the inner end thereof rests in the offset portion 7 of the rear or inner bracket 3.

Slidably engaged on the outer end of the middle bar 12 is a sleeve formed by a pair of flanged channel bars or plates 14, the flanges of which abut and are bolted or riveted together. The front end of one of the channel bars 14 is bent downwardly to form an arm or flange 15 while the other or upper bar 14 has the end thereof bent upwardly to form an arm or flange 16 (Figure 3). The downwardly directed flange 15 is provided with a key slot 17 and with side openings or apertures 18. Riveted or otherwise secured to the flanges 15 and 16 of the sleeve 14 is a front double tire clamp 19.

Secured on the bottom of the bar 12 is a channel guide and bracket arm 20 to which one end of a screw bolt 21 is pivotally engaged. Threaded on the free end of the screw bolt 21 is a clamping hand wheel 22 having a hub 23 of a diameter adapted to fit in the bight portion of the key slot 17 when the hand wheel is in clamping position so that the clamping screw bolt 21 will not drop downwardly out of the key slot.

When the sleeve 14 is clamped in position to permit the tire clamps 10 and 19 to hold a tire secured in place in the underslung tire carrier, a padlock 24 is engaged through the hand wheel 22 and through one of the openings 18 of the flange 15 of the slidable sleeve 14. Spare tires 25 may thus be clamped in position between the clamps 10 and 19 beneath the rear end of the truck chassis 1, as illustrated in Figure 1. The shiftable clamp 19 when adjusted may be locked in clamping position by padlocking the hand wheel 22 to the apertured downwardly directed flange 15.

The chassis sills 1 are provided with a plurality of apertures to permit different spacing of the two parallel brackets 2 and 3 to allow for the holding of different sized tires. The two tire clamps 10 may also be secured in different positions on the rear or inner bracket 3 to allow for different sized tires.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with an automobile truck chassis, of an underslung tire carrier comprising a pair of spaced parallel channel brackets rigidly secured to the chassis sills, a pair of spaced tire clamps on one of said brackets, a bar secured transversely on said brackets, a screw bolt pivotally connected to said bar, a slotted tire clamp slidably mounted on said bar adapted to receive the screw bolt, and a member adapted to be threaded on said bolt against the slidable clamp.

2. An underslung tire carrier comprising a pair of channel brackets adapted to be secured to the sills of a truck chassis, tire clamps on one of said brackets, a guide bar secured to both of said brackets, a sleeve slidable on said bar, a tire clamp on said sleeve, means for adjusting said sleeve and tire clamp on said bar and a lock for holding said sleeve in its adjusted position.

3. An underslung tire carrier comprising a pair of channel brackets adapted to be secured to the sills of a chassis, one of said brackets having the middle portion thereof depressed, said bracket also having a plurality of apertures therein, a plurality of tire clamps engaged on said apertured bracket, an apertured bar secured to said brackets, a sleeve slidable on one end of said bar, a tire clamp secured to said sleeve, a flange plate forming a part of said sleeve and having a key slot therein, a screw bolt pivoted on said bar and adapted to be engaged in said key slot, a hand wheel adapted to be threaded on said bolt to adjust said sleeve and tire clamp, and means for locking said hand wheel to said flange plate to hold the sleeve in its adjusted position.

In testimony whereof I have hereunto subscribed my name.

WALTER R. GREEN.